(12) United States Patent
Fujiwara et al.

(10) Patent No.: US 8,991,143 B2
(45) Date of Patent: Mar. 31, 2015

(54) WORK VEHICLE WITH A MOWER UNIT (71) Applicant: Kubota Corporation, Osaka-shi (JP)

(72) Inventors: Osami Fujiwara, Sakai (JP); Hironori Tsuchihashi, Sakai (JP); Kazutomo Miyaguchi, Sakai (JP); Kazunari Tsujino, Sakai (JP); Yoshikazu Takemoto, Sakai (JP)

(73) Assignee: Kubota Corporation, Osaka (JP)

( * ) Notice: Subject to any disclaimer, the term of this patent is extended or adjusted under 35 U.S.C. 154(b) by 108 days.

(21) Appl. No.: 13/775,506

(22) Filed: Feb. 25, 2013

(65) Prior Publication Data
US 2014/0059990 A1 Mar. 6, 2014

(30) Foreign Application Priority Data

Jun. 5, 2012 (JP) ................................. 2012-128318

(51) Int. Cl.
A01D 34/00 (2006.01)
A01D 69/00 (2006.01)
F02D 31/00 (2006.01)
F02D 41/24 (2006.01)
F02D 29/00 (2006.01)

(52) U.S. Cl.
CPC ............. A01D 34/006 (2013.01); A01D 69/00 (2013.01); F02D 31/007 (2013.01); F02D 41/2422 (2013.01); F02D 29/00 (2013.01); F02D 2200/50 (2013.01); F02D 2200/604 (2013.01)
USPC ...................................................... 56/10.2 R (58) Field of Classification Search
CPC ..... A01D 34/008; A01D 34/80; A01D 69/02; F02D 35/0007; F02D 29/02; F02D 41/0205; F02D 41/021; F02D 48/066; F16H 37/043; F16H 57/02

USPC ............. 56/10.6, 10.2 R, 13.5; 123/361, 350, 123/357; 180/292, 311, 312, 377; 290/40 R; 701/102, 104, 68, 110
See application file for complete search history.

(56) References Cited

U.S. PATENT DOCUMENTS

| 4,887,686 | A | * | 12/1989 | Takei et al. | 180/211 |
| 5,163,400 | A | * | 11/1992 | Yoshioka et al. | 123/361 |
| 5,394,678 | A | | 3/1995 | Lonn et al. | |
| 6,604,348 | B2 | * | 8/2003 | Hunt | 56/10.6 |
| 7,234,367 | B2 | * | 6/2007 | Hou et al. | 74/11 |
| 7,398,853 | B2 | * | 7/2008 | Ohtsuki et al. | 180/312 |
| 8,175,790 | B2 | * | 5/2012 | Stemler et al. | 701/110 |
| 8,364,363 | B2 | * | 1/2013 | Nakamura et al. | 701/68 |
| 8,798,878 | B2 | * | 8/2014 | Umemoto et al. | 701/51 |
| 2009/0265082 | A1 | | 10/2009 | Nishi et al. | |

FOREIGN PATENT DOCUMENTS

JP 2002106401 A 4/2002

* cited by examiner

Primary Examiner — Robert Pezzuto
(74) Attorney, Agent, or Firm — The Webb Law Firm (57) ABSTRACT A work vehicle includes wheels and a mower unit that are driven by power from an engine, and a mower driving detecting section for detecting power transmission condition to the mower unit. An isochronous controlling section controls the engine in an isochronous control mode for maintaining an engine rotational speed at a predetermined fixed value, independently of an engine load. A droop controlling section controls the engine in a droop control mode for varying the engine rotational speed in dependence on the engine load. If power is transmitted to the mower unit, the isochronous control mode is selected.

10 Claims, 11 Drawing Sheets

WORK VEHICLE WITH A MOWER UNIT

BACKGROUND OF THE INVENTION

1. Field of the Invention

The present invention relates to a work vehicle having an engine, wheels driven by power from the engine and a mower unit driven by the power from the engine.

2. Description of the Related Art

With such work vehicle as above-described, generally called a "lawn mower", the wheels and the mower unit are driven by the power from the engine, so that the vehicle can effect a grass mowing (or lawn mowing) operation while vehicle is traveling.

In recent years, for a grass mowing operation, in particular, a lawn mowing operation, there is a need for finish with high quality. One condition to satisfy this need is optimization of the relationship between the driving speed of the mower unit and the traveling speed of the vehicle. For instance, a turf maintenance vehicle disclosed in the U.S. Pat. No. 5,394,678 includes a reel type mower unit and employs a control arrangement for optimizing the relationship between the rotational speed of the reel and the traveling speed. More particularly, this turf maintenance work vehicle includes a vehicle speed sensor for detecting a vehicle speed, a reel rotation sensor for detecting a rotational speed of the reel, a controller for calculating, as a control target, a target reel rotational speed based on a detected vehicle speed, and a further controller configured to compare a detected reel rotational speed and a target reel rotational speed and then execute a feedback control so that the actual reel rotational speed may follow the target reel rotational speed.

With this turn maintenance work vehicle disclosed in U.S. Pat. No. 5,394,678, the feedback control is executed such that even if the vehicle speed changes, there is provided a reel rotational speed suitable for this changed vehicle speed. However, in case the vehicle speed fluctuates with significant frequency and in significant range, this may provide adverse effect on the finish of the lawn.

Meanwhile, in the case of a tractor, a work vehicle similar to a lawn mower, there is implemented an engine control technique having an isochronous control mode for maintaining a constant engine rotational speed irrespectively of variation in the load applied to the engine and a droop control mode for varying the engine rotational speed according to varying load. In this, for a work accompanied by vehicle traveling (this will be referred to as "work-accompanied traveling" hereinafter) such as a vehicle traveling with hauling a cultivator for instance, the isochronous control mode is implemented, so that the engine rotational speed is maintained constant regardless of variation in the load. Whereas, for a normal vehicle traveling, the droop control mode is implemented.

For example, in the case of a work vehicle disclosed in the US 2009/0265082 A1, a controller is set with an engine control scheme (droop control) based on a first governor characteristics which is a torque curve according to which the engine rotational speed varies according to torque variation and an engine control scheme (isochronous control) based on a second governor characteristics which is a torque curve according to which the variation of the engine rotational speed for torque variation is smaller than the first governor characteristics or the engine rotational speed does not vary at all, irrespectively of torque variation. And, depending on operational positions of a hand accelerator lever and a setting switch, either one of the droop control scheme or the isochronous control scheme is implemented.

In order to maintain constant the cutter blade rotational speed of the mower unit during a grass mowing operation, implementing the above-described isochronous control scheme in a lawn mower is convenient. However, in such a case when the work-accompanied traveling and a no-work-accompanied traveling (i.e. traveling not accompanied by any work) are effected in repeated alternation, the traveling operability will deteriorate if the isochronous control scheme is implemented during a no-work-accompanied traveling also. To avoid this, a setting switch needs to be provided and a troublesome procedure will be required for the driver in which the driver operates the setting switch to select the isochronous control mode for an work-accompanied traveling or the droop control mode for a no-work-accompanied traveling.

In view of the state of the art described above, there is a need for a work vehicle having a control system with superior operability for maintaining the cutter blade rotational speed constant.

SUMMARY OF THE INVENTION

A work vehicle having an engine, wheels driven by power from the engine and a mower unit driven by the power from the engine, the work vehicle comprises:

a mower driving detecting section for detecting a power transmission condition to the mower unit;

an isochronous controlling section for controlling the engine in an isochronous control mode for maintaining an engine rotational speed at a predetermined fixed value, independently of an engine load;

a droop controlling section for controlling the engine in a droop control mode for varying the engine rotational speed in dependence on the engine load; and a control mode selecting section for selecting engine control by the isochronous controlling section if power transmission to the mower unit is detected by the mower driving detecting section.

With the above-described arrangement, the mower driving detecting section checks whether rotational drive power is now being transmitted from the engine to the mower unit or not. Then, if occurrence of such power transmission is detected, it is determined that the mower unit is now being rotatably driven and engaged in a grass mowing operation, so that engine control by the isochronous controlling section is implemented. As a result, regardless of variation in the engine load, the engine rotational speed is maintained constant, whereby a stable mower unit drive using engine power without rotational speed variation is realized. This technical concept was realized, based on an understanding that in the inventive work vehicle, the vehicle can be determined as being in a no-work-accompanied traveling, not work-accompanied traveling, unless the engine power is transmitted to the mower unit. With this arrangement, without requiring any selecting operation by a separately provided mode selection switch or the like, engine control by the isochronous control mode can be selected for a work-accompanied traveling, and engine control by the droop control mode can be selected for a no-work-accompanied traveling.

Moreover, in the isochronous control mode, by using the rotational speed at the time of maximum output of the engine as the constant engine rotational speed, it becomes possible to avoid engine noise due to unnecessary high speed rotation during a work. In addition, as the rotational speed of the engine as its power source is maintained constant, the driving rotational speed for the mower unit too can be fixed to an optimal rotational speed, whereby the utility work performance can be improved.

According to one preferred embodiment, a PTO clutch for engaging/disengaging only the power transmission to the mower unit is incorporated in a power transmission pathway from the engine to the mower unit, and the mower driving detecting section is provided as a detecting device for detecting the engagement/disengagement of the PTO clutch incorporated in the power transmission pathway between the engine and the mower unit.

As a mower unit, there are known a reel type and a blade type. The blade type includes a housing opened on the ground-facing side and a blade rotated about a vertical axis inside the housing. In association with rotation of the blade, an airflow is generated inside the housing. In particular, if the blade forms a wind generating vane, this wind generating vane will generate such an airflow that will blow away cut grass clippings. In any case, the intensity of the airflow will significantly vary depending on the rotational speed of the blade. The grass cutting performance and grass clippings conveying performance will suffer if the airflow is too strong or too weak. For this reason, it is important that the rotational speed of the blade be maintained at a predetermined value. From this point of view, the present invention is particularly suitable for the blade type work vehicle.

In the isochronous control mode, in order to maintain the engine rotational speed as constant as possible irrespective of engine load, fuel supply to the engine is adjusted for instance. However, when the engine load exceeds the engine capacity, there occurs reduction in the rotational speed, or even an engine stall in the worst case. For this reason, advantageously, there are prepared a plurality of isochronous control characteristics maps as maps for the isochronous control for respective differing grass mowing conditions that may significantly affect the engine load. In particular, under a grass mowing condition that causes high engine load, there will be implemented a map that allows a certain level of rotational speed reduction in accordance with increase in the load, whereby occurrence of engine stall can be restricted.

In a traveling in the isochronous control mode, because the driving feel under this mode significantly differs from that in the droop control mode, it is important that the driver be aware of the isochronous control mode being currently executed. For this reason, according to one preferred embodiment of the present invention, there is provided an alerting device for alerting ongoing execution of engine control by the isochronous controlling section. In this, advantageously, the alerting device comprises a display portion provided in a display for displaying an engine rotational speed. For instance, by illuminating or flashing a predetermined portion on the display, the driver can readily take notice that the vehicle is currently in the isochronous control mode.

DETAILED DESCRIPTION OF THE PREFERRED EMBODIMENTS

Next, a front mower will be explained as an embodiment of a work vehicle relating to the present invention, with reference to the accompanying drawings.

Figure 1:
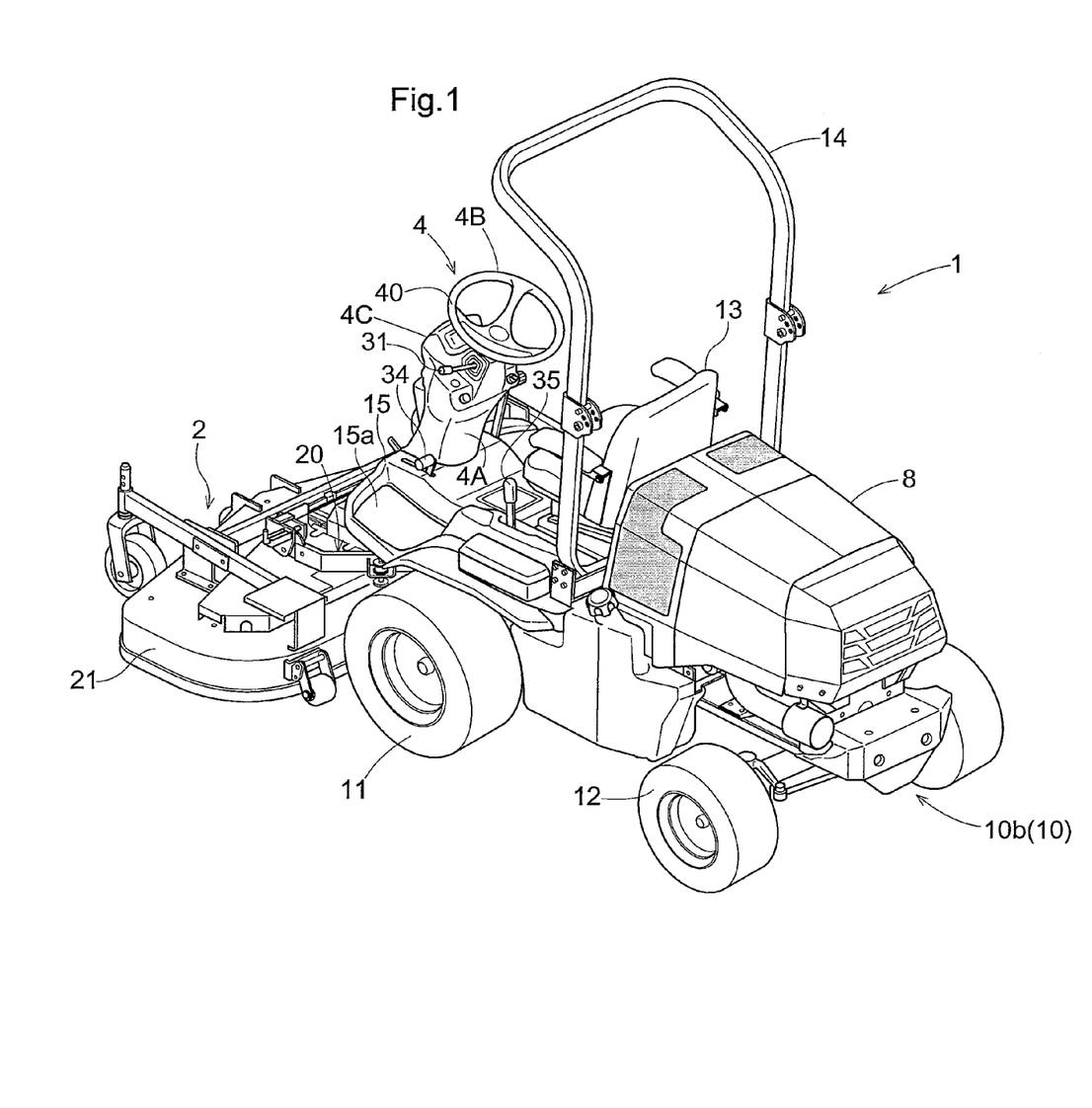
FIG. 1 is a perspective view of a front mower.
Figure 2:
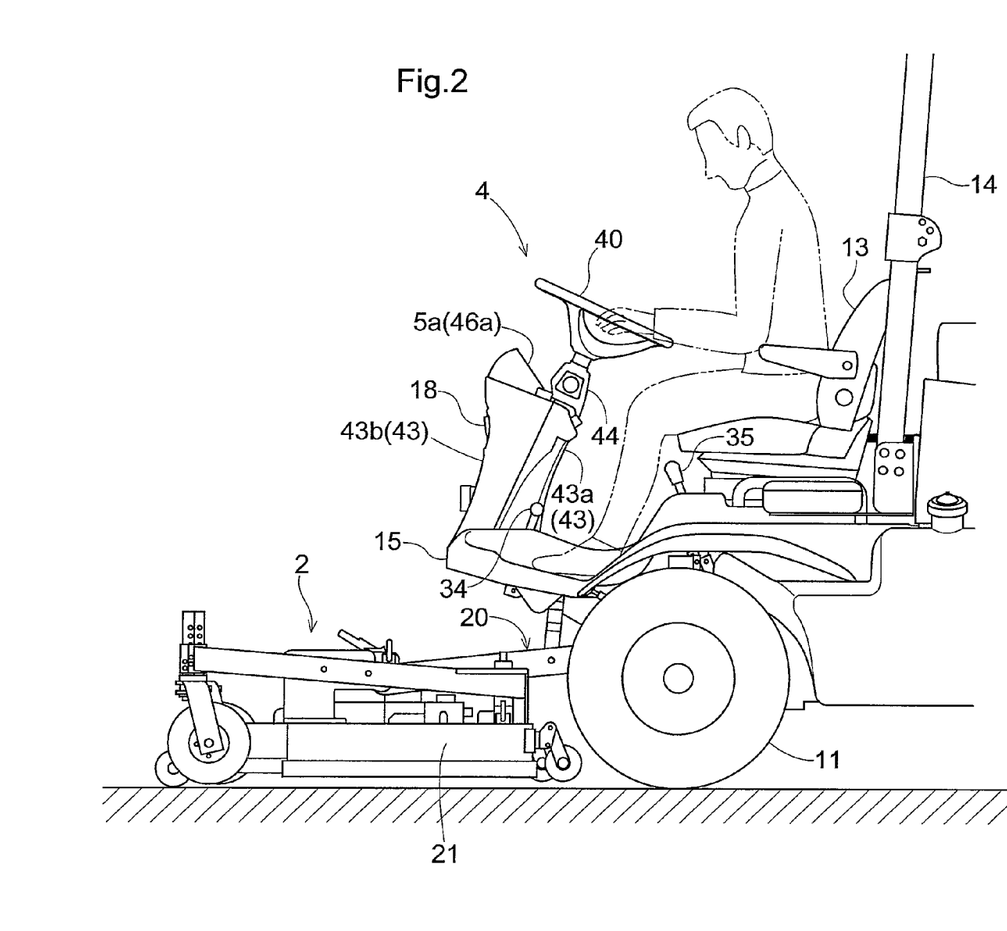
FIG. 2 is a side view showing a front half portion of the front mower.

FIG. 1 shows a perspective view showing this front mower as seen in an obliquely rearward direction and FIG. 2 shows a side view showing the front half region of the front mower.

A frame 10 constituting a vehicle body 1 of the front mower is supported on front wheels 11 and rear wheels 12. The frame 10 consists of a front frame 10a and a rear frame 11b, each of which includes left and right vertical members extending along the longitudinal direction (traveling direction) of the vehicle body 1 and cross members interconnecting them. A mower unit 2 as a ground utility work unit is supported via a lift mechanism 20 to be lifted up/down, with the mower unit 2 projecting forwardly from the front frame 10a on the front side of the font wheels 11 and downwardly of the front frame 10a. In this description, unless indicated otherwise, terms indicative of positional relationship such as front (forward), rear (backward) are used relative to the longitudinal direction (traveling direction) of the vehicle body 1.

Figure 3:
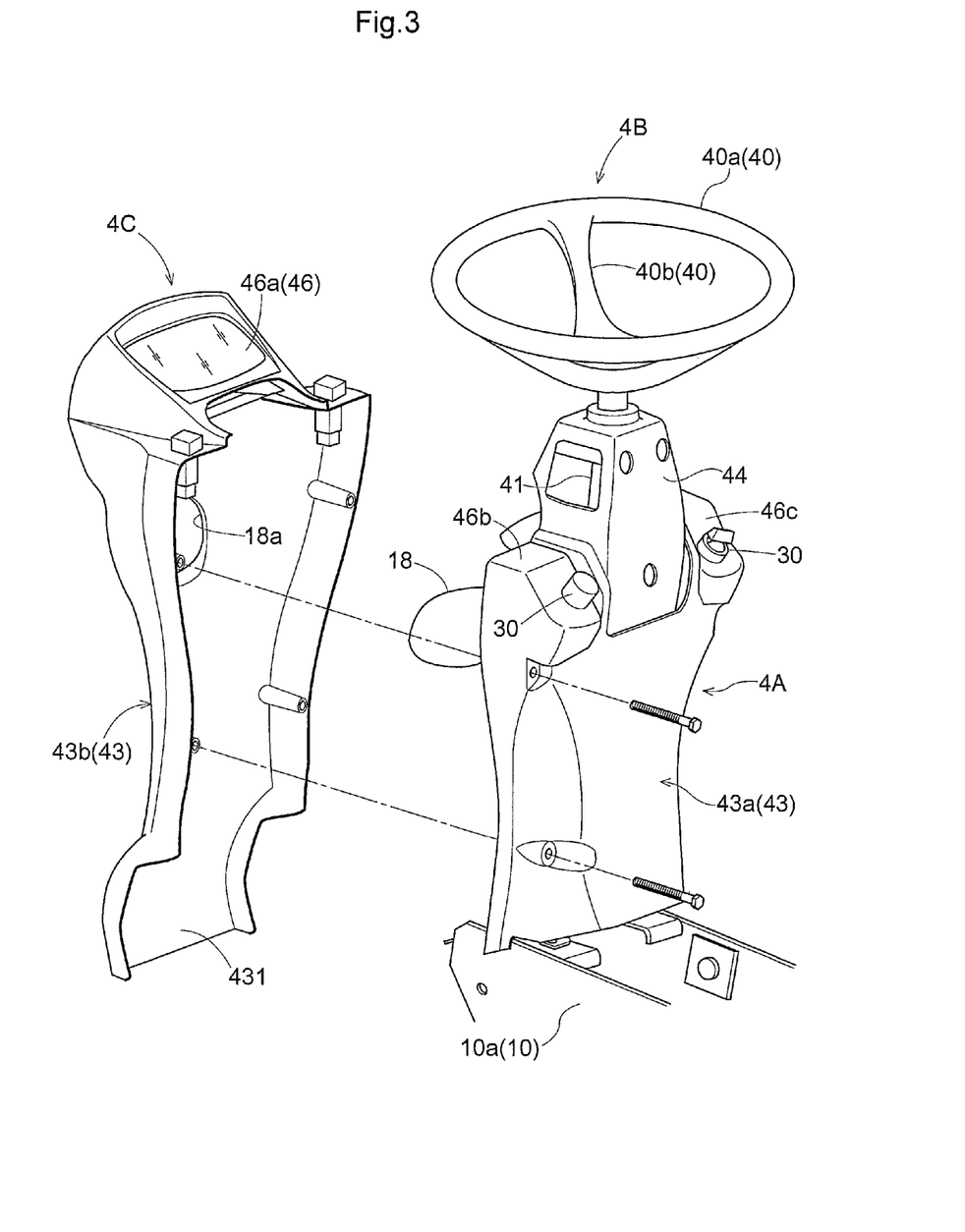
FIG. 3 is an exploded perspective view of a steering post.
Figure 4:
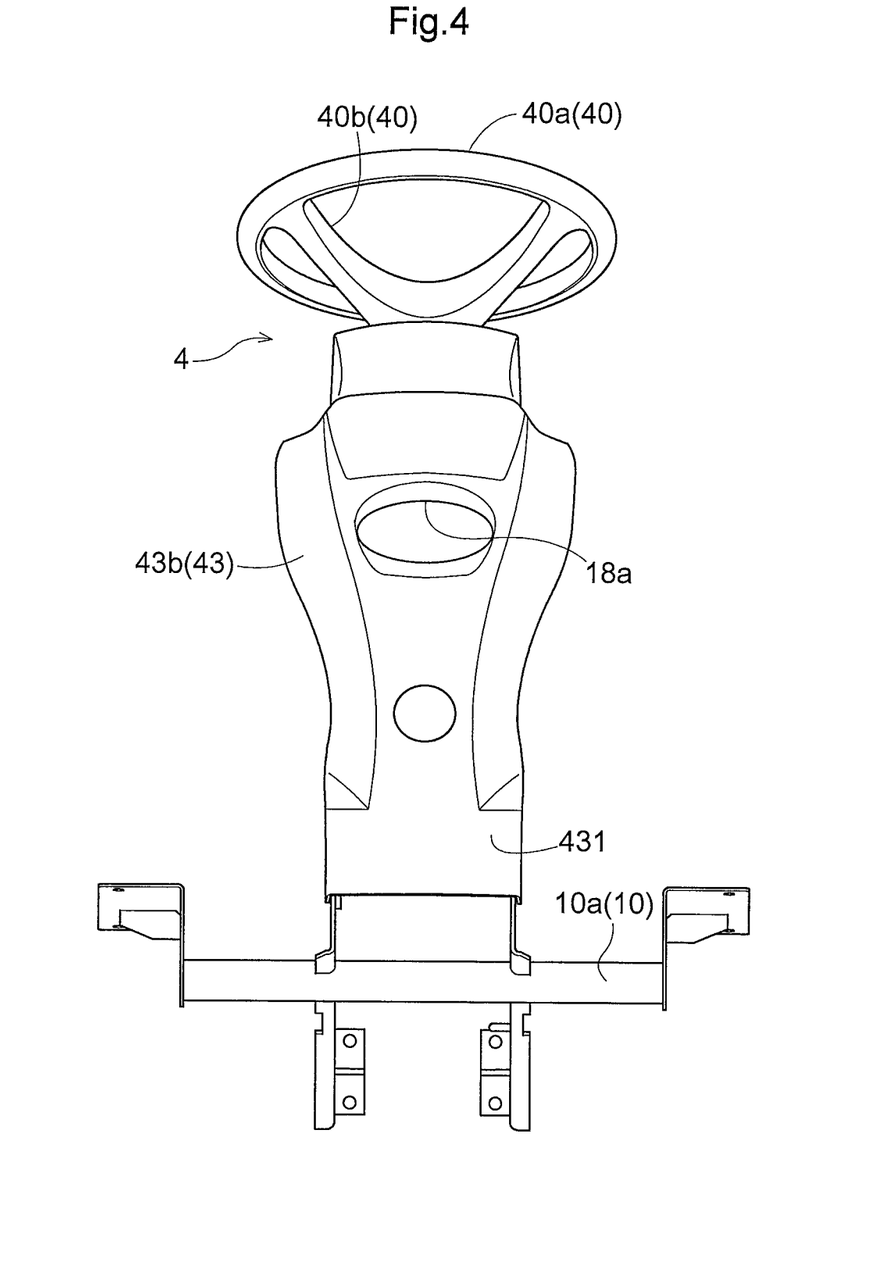
FIG. 4 is a front view of a steering device.
Figure 5:
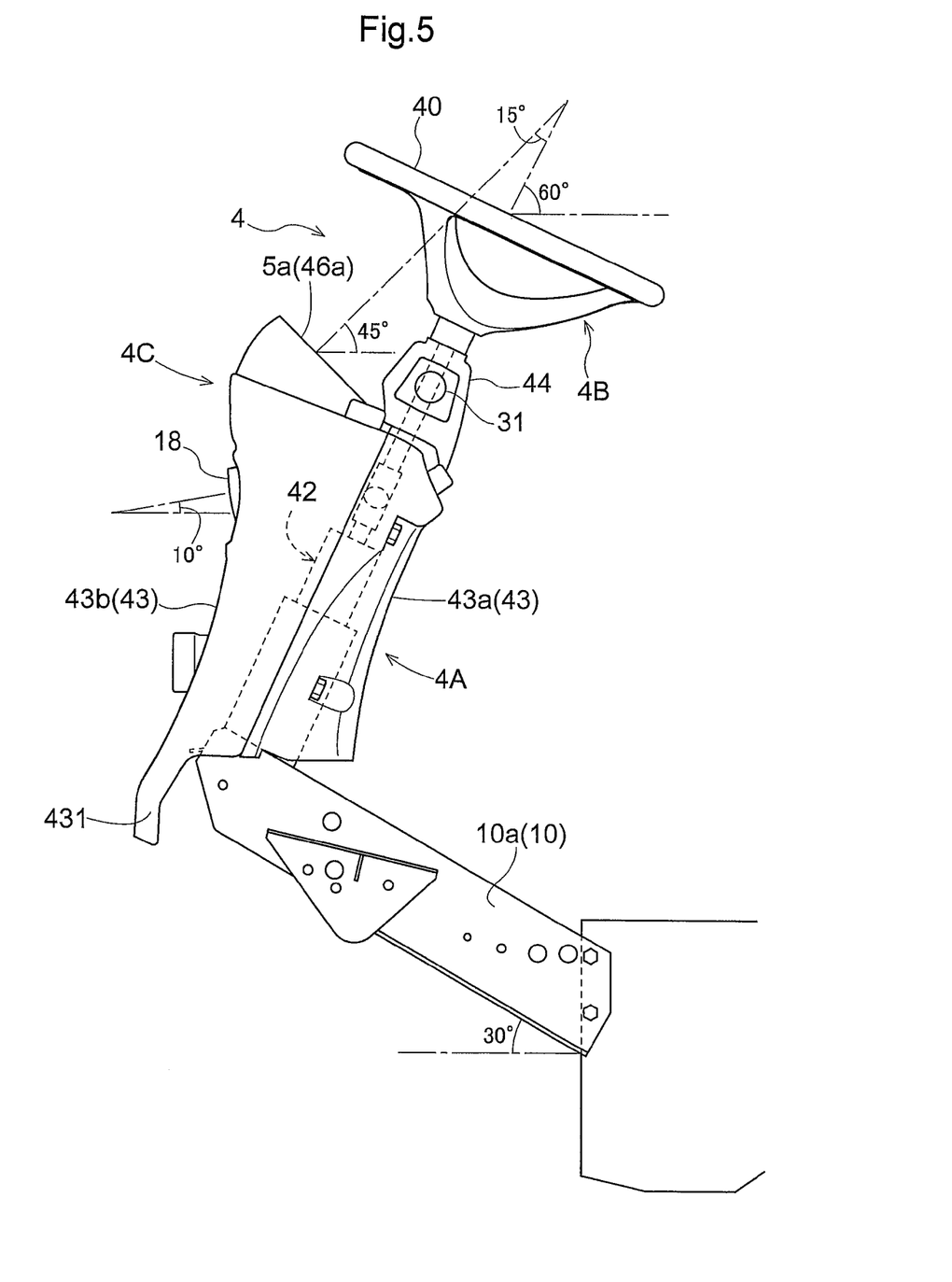
FIG. 5 is a side view of the steering device.

The front half region of the vehicle body 1 is a driving region. In this region, a steering device 4 is disposed at the front end area of the front frame 10a and a driver's seat 13 is disposed at the rear end area of the front frame 10a. As shown in FIG. 3, FIG. 4 and FIG. 5, the steering device 4 includes a steering post 4A extending upwardly with a slight rearward inclination from the front end area of the front frame 10a at substantially center in the vehicle body width direction, a steering wheel unit 4B supported to the steering post 4A and a man-machine interface panel unit 4C.

The steering post 4A consists of a first steering post 43 fixed to a cross beam constituting the front end of the front frame 10 and a second steering post 44 connected to the upper end of the first steering post 43. The first steering post 43 is a hollow body forming an accommodating space therein and as may be apparent from FIG. 3, this is a bolt-connected two-part assembly consisting of a rear panel 43a as a base panel and a front panel 43b as an auxiliary panel. As the front panel 43b forms the front side (face) of the front mower, a skirt portion 431 is formed at the lower portion of this front panel 43b. This skirt portion 431 is configured to cover the connecting arrangement between the rear panel 43a and the frame 10. The first steering post 43 exhibits an inverted triangular shape when seen in the front/rear direction of the vehicle body, but has a curved outer contour. Further, when seen in the vehicle body width direction, the upper portion of the auxiliary panel 43b protrudes forwardly. At the upper portion of the first steering post 43, there are formed a pair of left and right projecting portions that project in the form of bifurcation; and in the recessed space created therebetween, the second steering post 44 is inserted. The second steering post 44 too is a hollow body and has an approximately angular pillar-like shape to be snugly fitted within the recessed space of of the first steering post 43.

The steering wheel unit 4B includes a steering wheel 40 consisting of spokes 40b and a ring 40a; and a steering shaft 41 operably connected to the steering wheel 40. The steering shaft 41 is accommodated in the hollow interior of the second steering post 44. An angular displacement of the steering shaft 41 is transmitted to a power steering unit 42 constituting a full hydraulic power steering mechanism which per se is known, thus providing a change of steering angle of the steerable wheels (the rear wheels 12 in the case of the present embodiment). In this embodiment, the second steering post 44 is mounted to be pivotable in the front/rear direction relative to the first steering post 43, thus providing readiness in tilting adjustment of the steering wheel 40 as well as readiness in a driver's getting on/off the vehicle. To this end, a universal joint is disposed between the steering shaft 41 and the power steering unit 42 and the power steering unit 42 is substantially accommodated inside the first steering post 43.

The man-machine interface panel unit 4C comprises a group of panel modules 46 including interface devices for effecting informing/alerting outputs for informing/alerting the driver of e.g. conditions of various instruments. For each member of the panel module group 46, there is formed a man-machine interface face which constitutes a display face easily viewed by the driver and/or a control face easily operable by the driver. Here, the panel module group 46 is disposed in the periphery of the rotational axis of the steering wheel 40, i.e. the rotational axis of the steering shaft 41. More particularly, the panel module group 46 includes a first panel module 46a disposed adjacent the front side of the second steering post 44, a second panel module 46b disposed adjacent one lateral side of the second steering post 44 and a third panel module 46c disposed adjacent the other lateral side of the second steering post 44.

The first panel module 46a disposed on the front side of the driver seated at the driver's seat 13 is arranged on the top face of the front panel 43b and creates a display face thereon. The second panel module 46b and the third panel module 46c, disposed in correspondence with the hands of the driver seated at the driver's seat 13, are arranged on the respective top faces of the left and right projections of the rear panel 43a. The second panel module 46b creates a left-side operation face facing the steering wheel 40 and the third panel module 46c creates a right-side operation face facing the steering wheel 40. In this case, the display face, the left-side operation face and the right-side operation face are included in the man-machine interface for the driver positioned downwardly of the steering wheel 40.

Figure 6:
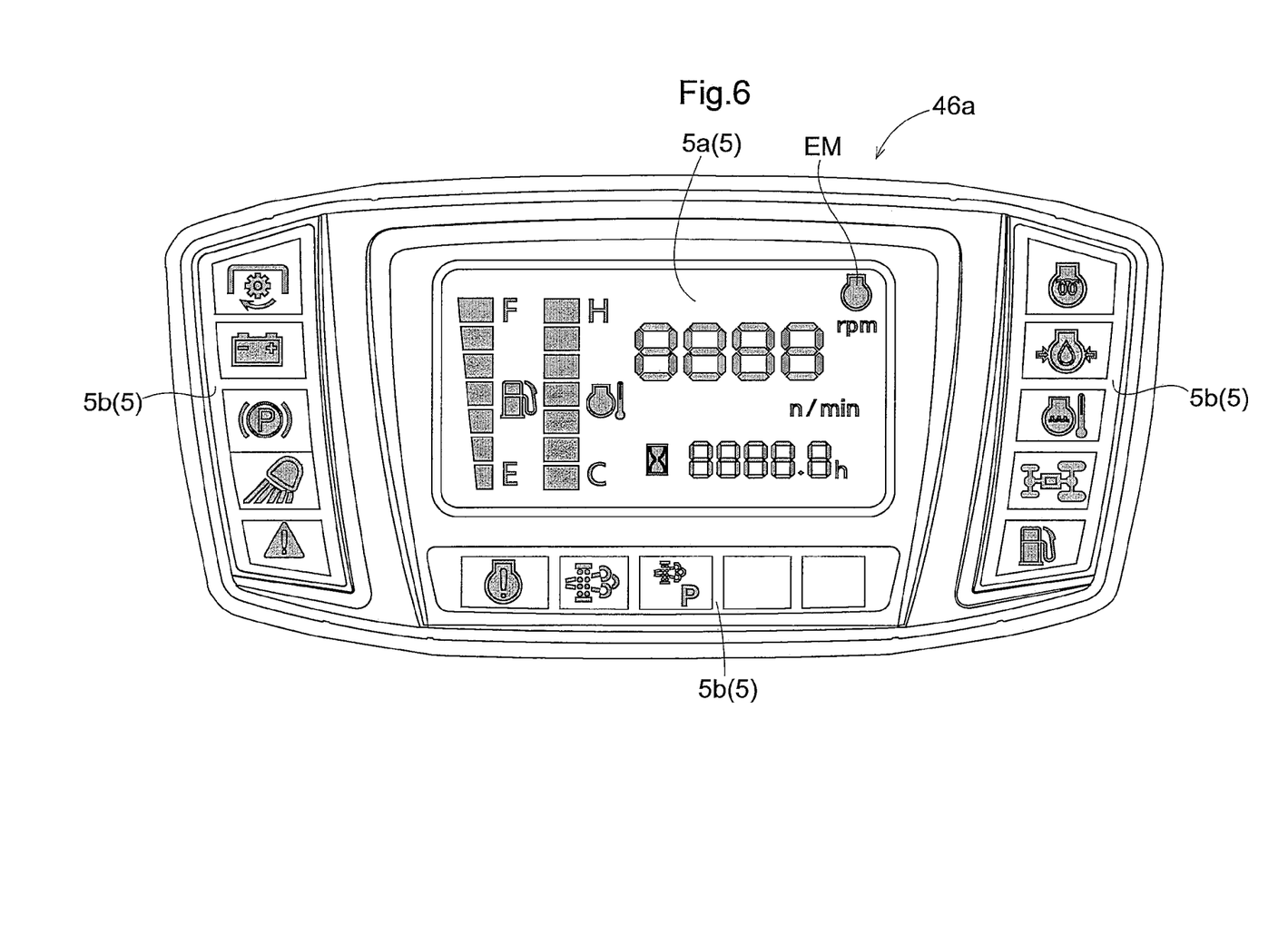
FIG. 6 is a front view of a panel module.

As shown in FIG. 6, the first panel module 46a incorporates a large-size flat display panel 5a as a first display unit constituting a first display section and further incorporates LED panel units 5b on the opposed sides thereof as a second display unit constituting a second display section. The flat panel display 5a displays numerical values, characters, signs, graphic illustrations indicative of various kinds of information. For the sake of enhanced visibility of these displays by the driver seated at the driver's seat 13, as may be apparent from the illustration in FIG. 5, the flat panel display 5a is disposed with an inclination so that the normal line of its displaying plane and the rotational axis of the steering wheel may intersect each other at a point upwardly of the steering wheel. Namely, the steering wheel 40 is operated by a driver's hands and the driver's seat 13 is disposed such that the face of the driver may be located rearwardly of the extension line of the rotational axis of the steering wheel. Then, if the flat display panel 5a is disposed with such inclination as described above, the seated driver can view the screen of this flat display panel 5a more easily.

Incidentally, the flat panel display 5a can be formed generally of liquid crystals. However, the invention is not limited thereto. Other display such as organic electroluminescence, LED (light emitting diodes), VFD (vacuum fluorescent display), PDP (plasma display panel), etc. can be used instead. Further, instead of the LED panel unit 5b, a panel unit comprised of other illumination devices or light emitting elements may be employed. Namely, what is referred to as a "flat panel display" 5a in this invention means any panel type display introduced as a commercial product after the more conventional CRT type display, and its display face may be curved.

As shown in FIG. 3, FIG. 4 and FIG. 5, an opening 18a for mounting a headlamp 18 is provided at the center of the front panel 43b slightly downwardly of the first panel module 46a. The headlamp 18 is disposed with its optical axis oriented slightly downward than the horizontal, so that this headlamp 18 is capable of directly illuminating the surrounding of the mower unit 2, too. The most part of the headlamp 18 except for its shield glass is accommodated in the inside space of the first panel module 46a, and the headlamp 18 has such an outer appearance that hardly projects to the outside from the recessed curved face forming the intermediate portion of the front panel 43b.

As may be apparent from FIG. 5, the front side of the front frame 10a has an approximately 30 degrees of forwardly upward inclination and from its leading end top face, the first steering post 43, more particularly the rear panel 43b, extends vertically. Namely, the first steering post 43 extends with an approximately 60 degrees of inclination relative to the ground surface. Further, the displaying face normal line of the flat panel display 5a forms about 45 degrees relative to the horizontal, so that this displaying face normal line intersects the rotational axis of the steering wheel 40 at a position adjacent the steering wheel 40, preferably, a position upwardly thereof. Incidentally, the optical axis of the headlamp 18 has an approximately 10 degrees of downward inclination.

Figure 7:
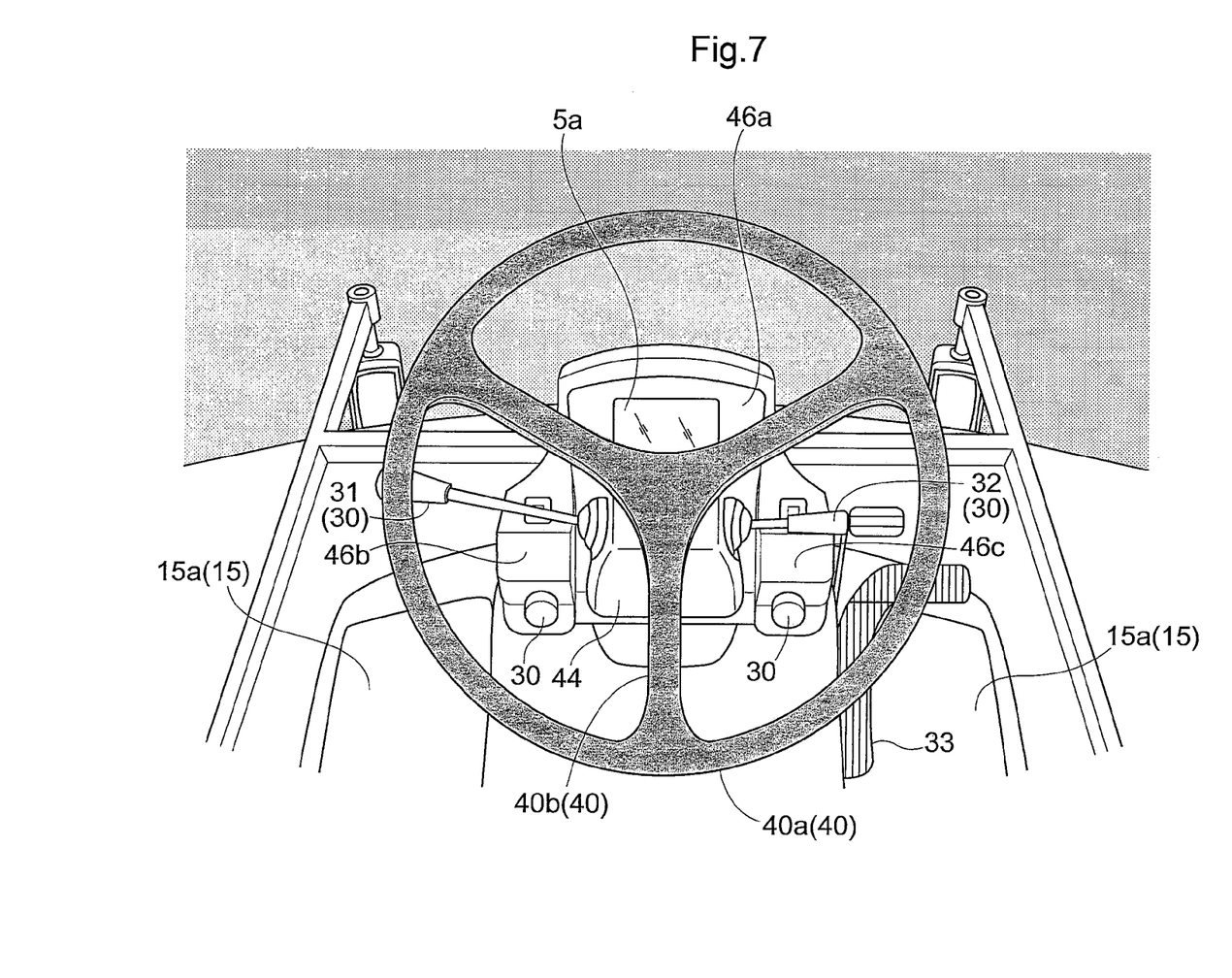
FIG. 7 is an outer appearance view showing the steering device as seen from a driver.

The above-described positional relationship between the flat panel display 5a (i.e. the first panel module 46a) and the steering wheel 40; and the shapes of the ring 40a and the spokes 40b together constituting the steering wheel 40 contribute to improvement in the visibility of the flat panel display 5a by the driver seated at the driver's seat 13. FIG. 7 schematically shows the field of view seen from the driver seated at the driver's seat 13 as the viewpoint. As may be understood from this FIG. 7 illustration, when seen along the rotational axis of the steering wheel 40, at least one opening delimited by the spokes 40b and the ring 40a of the steering wheel 40 is formed larger than the flat panel display 5a. With this arrangement, the driver can see with good visibility the screen of the flat panel display 5a through this opening. Whereas, the length in the vehicle body width direction of the total operation face combining the operation face of the second module panel 46b and the operation face of the third module panel 46c, on which operation input devices such as buttons, switches or the like to be operated by the left hand and the right hand, respectively, is set greater than the flat panel display 5a. With this arrangement, the operation face of the second module panel 46b and the operation face of the third module panel 46c protrude beyond the flat panel display 5a to the outside in the vehicle body width direction, whereby the hand operability of the second panel module 46b and the third panel module 46c is improved. In the instant embodiment, in the second operation face constituted by the second panel module 46b, manual operation selection buttons, an illumination switch for DPF (Diesel Particulate Filter) are disposed, whereas in the second operation face constituted by the third panel module 46c, an automatic operation input button, a key switch, etc. for the PDF as an operation input device 30, are disposed.

From the left and right side faces of the second steering post 44, a first operation lever 31 and a second operation lever 32 protrude, respectively. In this example, the first operation lever 31 protruding from the left side face of the second steering post 44 is a tilt locking/releasing lever for the second steering post 44, i.e. for the steering wheel 40. The second operation lever 32 protruding from the right side face of the second steering post 44 is an accelerator lever.

For obtaining better visibility through the openings of the steering wheel 40, it is preferred that the ring 40a and the spokes 40b be formed as narrow as possible so as to increase the area of the openings.

Further, in the instant embodiment, the ring 40a is formed circular, but this can be formed oval or polygonal if appropriate. The spokes 40b too can be of any other type than the three-spoke type illustrated. But, good visibility through the opening should be ensured in doing so.

As may be understood from FIG. 1, in the left and right peripheral areas of the steering device 4 and the driver's seat 13 upwardly of the front frame 10a and in the areas between the steering device 4 and the driver's 13, there is formed a floor 15. In this, from the respective opposed sides of the steering device 4 to the rear side, footrest sections 15 are formed upwardly of forwardly rising inclined portions, and on these, anti-slipping material is provided. Instead of providing such anti-slipping material, the plate member constituting the floor 15 may be provided with an anti-slippage function with formation of projections or the like thereon. On the floor 15, there are mounted such components as a speed changing pedal 33, a parking lever 34, as well as a PTO clutch lever 35 for a PTO clutch for switching ON/OFF PTO power transmission for transmitting engine power to the mower unit 2.

The rear half region of the vehicle body 1 forms a power source region. Though not shown in FIG. 1 as being covered with a hood unit 8, in the instant embodiment, a water-cooled engine (simply the "engine" hereinafter) and engine auxiliary devices are disposed. Between the driver's seat 13 and the hood unit 8, a portal-shaped framework commonly called a ROPS 14, is disposed vertically.

Figure 8:
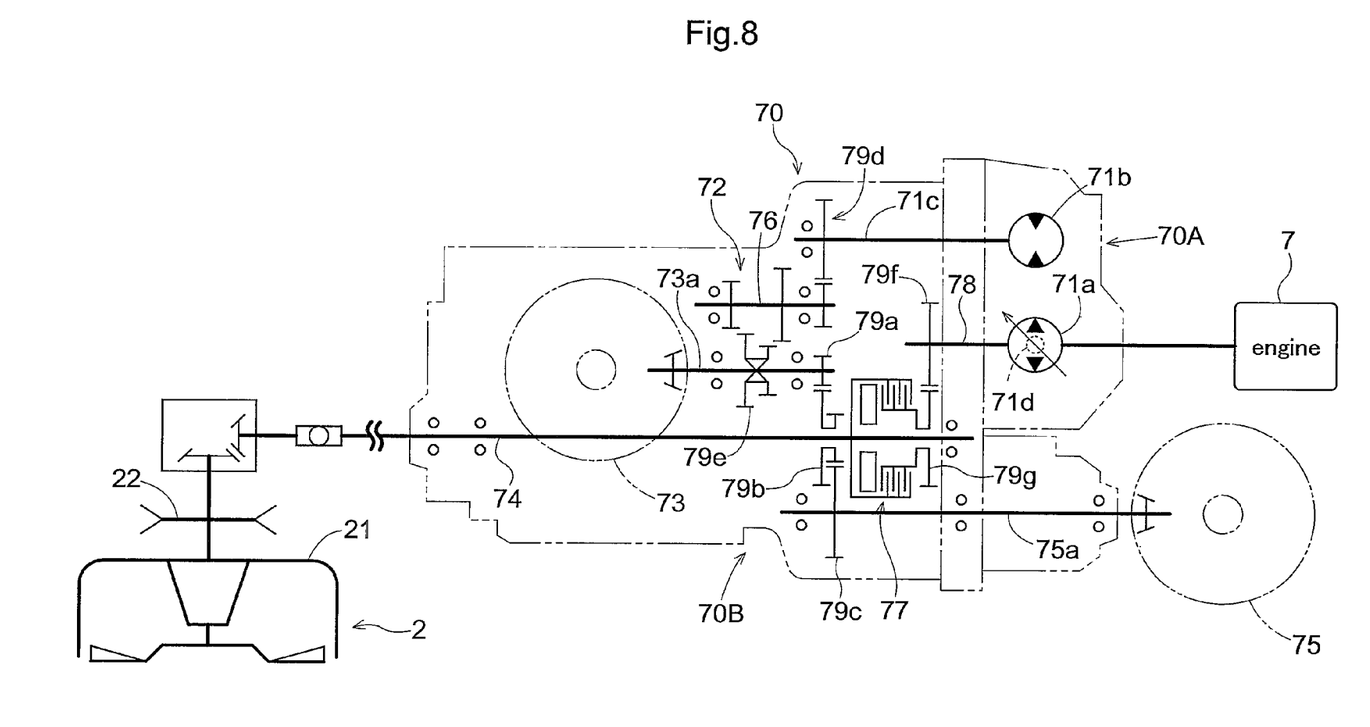
FIG. 8 is a diagram showing arrangement of a transmission.

FIG. 8 shows a transmission 70 of this front mower. This transmission 70 includes a stepless speed changer device 70A for changing the speed of the output of the engine 7 in a stepless manner, and a gear transmission device 70B for transmitting speed-changed power to the front wheels 11 and the rear wheels 12 and transmitting the engine output to the mower unit 2, bypassing the stepless speed changer device 70A. The transmission 70 further includes a PTO shaft 74 as a part of a power transmission pathway between the engine 7 and the mower unit 2.

The stepless speed changer device 70A consists of a variable displacement type hydraulic pump 71a and a hydraulic motor 71b driven with supply of work oil from this hydraulic pump 71a. Power from an output shaft 71c of the hydraulic motor 71b is transmitted via an auxiliary speed changer device 72 constituting the gear transmission device 70B and a bevel pinion shaft 73a to a front wheel differential device 73. Power from a gear 79a formed on the bevel pinion shaft 73a is transmitted to a rear wheel differential device 75 via an intermediate gear 79b loosely mounted on the PTO shaft 74 via a needle bearing and an intermediate transmission shaft 75a having a gear 79c meshing therewith.

Also, in the lateral face of the hydraulic pump 71a, a trunnion shaft 71d for adjusting the discharge amount of work oil from the hydraulic pump 71a is mechanically connected to the speed changer pedal. Incidentally, in order to realize a cruising travel (constant speed travel), though not shown, there is also provided a retaining mechanism for retaining the trunnion shaft 71d at a selected position. The auxiliary speed changer device 72 receives the power from the output shaft 71c of the hydraulic motor 71b via a gear pair 79d. For selective meshing with a high-speed gear and a low-speed gear mounted on a counter shaft 76 extending parallel with the bevel pinion shaft 73a, there is provided a shift gear 79e splined on the bevel pinion shaft 73a. And, this shift gear 79e is mechanically coupled with an auxiliary speed changer lever 36 disposed adjacent the driver's seat 13. An input gear 79g meshed with an output gear 79f coupled with a live shaft 78 extending through the hydraulic pump 71a of the stepless speed changer device 70A is loosely mounted on the PTO shaft 74 via a bearing, and between this input gear 79g and the PTO shaft 74, there is mounted a hydraulic PTO clutch 77. The PTO shaft 74 is connected to a belt transmission mechanism 22 of the mower unit 2. The mower unit 2 includes three grass cutting/mowing blades 23 shrouded by a mower deck 21. The blades 23 are driven to rotate about a vertical axis by the belt transmission mechanism 22. Each blade 23, as well-known, has a band-plate like shape and includes wind-generating projections called wind-generating vanes. These projections generate an airflow for conveying cut grass clippings to a side discharging exit of the mower deck in association with rotation of the blades 23.

Figure 9:
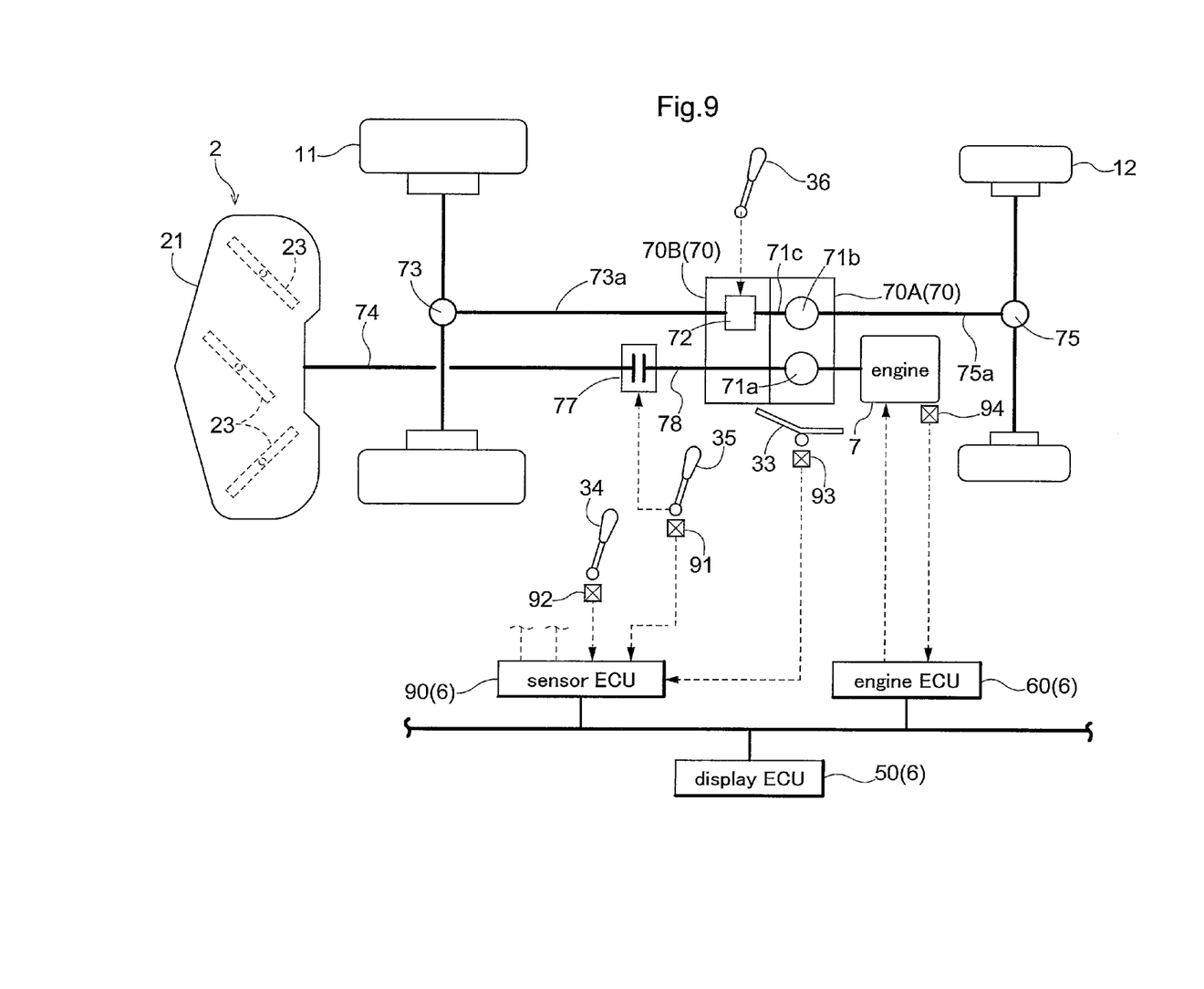
FIG. 9 is a block diagram showing an engine control system and a display control system.

FIG. 9 shows a block diagram of an engine control system and a display control system of this front mower, showing a display ECU 50, an engine ECU 60 and a sensor ECU 90 as an electronic control unit (ECU) 6 relating particularly to the engine control system and the display control system in this front mower.

In FIG. 9, the sensor ECU 90 is provided as a control unit configured to generate and output vehicle condition signals based on detection signals received from the various detection devices. To this sensor ECU 90, there are connected a PTO clutch sensor (one of the detection devices) 91 for detecting ON/OFF position of the PTO clutch lever 35 for operating the PTO clutch 77, a parking sensor (another detection device) 92 for detecting ON/OFF position of the parking lever 34, a speed position sensor 93 for detecting a swash plate angle of the hydraulic pump 71a, etc.

In this front mower, the PTO shaft 74 transmits the power from the engine 7 to the mower unit 2. Therefore, the PTO clutch sensor 91 for detecting the position of the PTO clutch lever 35 for the PTO clutch 77 for turning ON/OFF this power transmission functions as a "mower driving detecting section" for detecting the power transmission condition to the mower unit 2. In this, one of such possible power transmission conditions to the mower unit 2 is power transmission to the mower unit 2 with ON position of the PTO clutch 77 and the resultant rotation of the blades 23. Another such condition is blocking of power transmission to the mower unit 2 in association with the OFF position of the PTO clutch 77 and the resultant stop of the blades 23.

Figure 10:
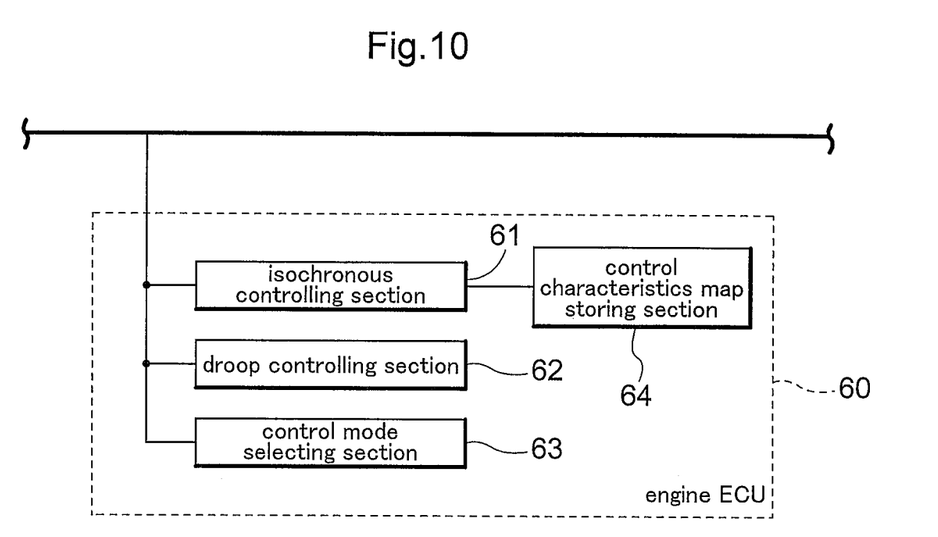
FIG. 10 is a block diagram showing an engine ECU.

The engine ECU 60 includes an isochronous controlling section 61, a droop controlling section 62, a mode selecting section 63 and a map table 64.

The isochronous controlling section 61 has an isochronous control function for maintaining the rotational speed of the engine 7 at a predetermined fixed value independently of engine load. When this isochroous control mode is selected, once a certain engine rotational speed is set by the driver or set in advance, for instance, the actual engine rotational speed will be maintained at this set rotational speed, irrespectively of variation occurring in the engine load. For instance, fuel injection amount (or the governor position) will be increased in association with increase in the engine load (or the engine torque), thereby to maintain the engine rotational speed constant. As this isochronous control per se is well-known, further detailed discussion thereof will be omitted herein. But, explanation thereof will be found in some patent publications, represented by US 2009/0265082 A1, JP 2002-106401 A, etc.

The droop controlling section 62 has a droop control function for controlling the engine 7 in a droop control mode for varying the engine rotational speed in dependence on the engine load. When this droop control mode is selected, drop in the engine rotational speed is permitted in accordance with rise in the load from the zero load condition (idling operation). The driver may avoid such drop in engine rotational speed by stepping on the accelerator pedal in response to the engine rotational speed drop. However, this drop in the engine rotational speed may be utilized for traveling. As this droop control per se is well-known, further detailed discussion thereof will be omitted herein. But, explanation thereof will be found in the above-identified publications, for instance.

The control characteristics map storing section 64 stores therein a plurality of so-called isochronous control characteristics maps as a group of isochronous control characteristics maps which define fuel injection amounts (or governor positions) corresponding to various engine loads (engine rotational speed reduction) in order to avoid or limit reduction of engine rotational speed within a certain range. In operation, as the isochronous controlling section 61 makes an access to this control characteristics map storing section 64 and determines a fuel injection amount (or a governor position) corresponding to an engine load (engine rotational speed reduction). To this end, the engine ECU 60 inputs a detection signal from the engine rotational speed sensor 94 mounted on the engine 7.

The control mode selecting section 63 selects the engine control by the isochronous controlling section 61 if power transmission to the mower unit 2 is detected by the mower driving detecting section. On the other hand, when the power transmission to the mower unit 2 is blocked, the control mode selecting section 63 selects the engine control by the droop controlling section 62. As described above, in this embodiment, the PTO clutch sensor 91 is employed as the mower driving detecting section. Therefore, if the PTO clutch lever 35 is operated to turn ON (i.e. engage) the PTO clutch 77, the isochronous control will be executed for the engine 7. Whereas, if the PTO clutch lever 35 is operated to turn OFF (i.e. disengage) the PTO clutch 77, the droop control will be executed for the engine 7.

For instance, when the PTO clutch lever 35 is turned ON to carry out a grass (lawn) mowing operation, the isochronous control is executed, so that an engine rotational speed defined by the isochronous control characteristics map is maintained. As a result, a rotational speed suitable for the blades 23 of the mower unit 2 will be maintained, so an appropriate mowing operation can be carried out. In this, "a rotational speed suitable for the blades 23 of the mower unit 2" means a rotational speed which optimizes the evaluations items such as mowing quality, noise generation, fuel consumption, etc. However, such rotational speed will differ depending also on the mowing conditions such as the type of the lawn, the condition of the lawn, etc. Therefore, there may be provided in advance a plurality of isochronous control characteristics maps, so that one of them may be selected depending on the particular mowing condition.

Incidentally, during execution of the isochronous control mode, the engine rotational speed remains substantially constant, thus providing the driver with a driving feel different from the normal driving feel. Therefore, this execution of the engine control by the isochronous controlling section 61 will be informed or alerted to the driver. As an alerting device for use in this alerting (informing) can advantageously be lighting or flashing of a lamp or generation of an alert sound by a buzzer, etc. In the instant embodiment, in the flat panel display 5a, there is provided an isochronous control ON displaying icon in the vicinity of the displaying area for displaying an engine rotational speed and this icon is lit or flashed as a displaying section for displaying ongoing execution of the isochronous control.

When the PTO clutch lever 35 is turned OFF, the PTO clutch 77 is disengaged, so that no rotational power is transmitted to the mower unit 2 and the blades 23 are stopped. That is, there is not provided a work-accompanied traveling involving a simultaneous grass mowing operation, but provided no-work-accompanied traveling just like traveling of a passenger automobile. Therefore, as triggered by an OFF operation of this PTO clutch lever 35, the engine drive mode is shifted to the droop control by the droop controlling section 62.

Figure 11:
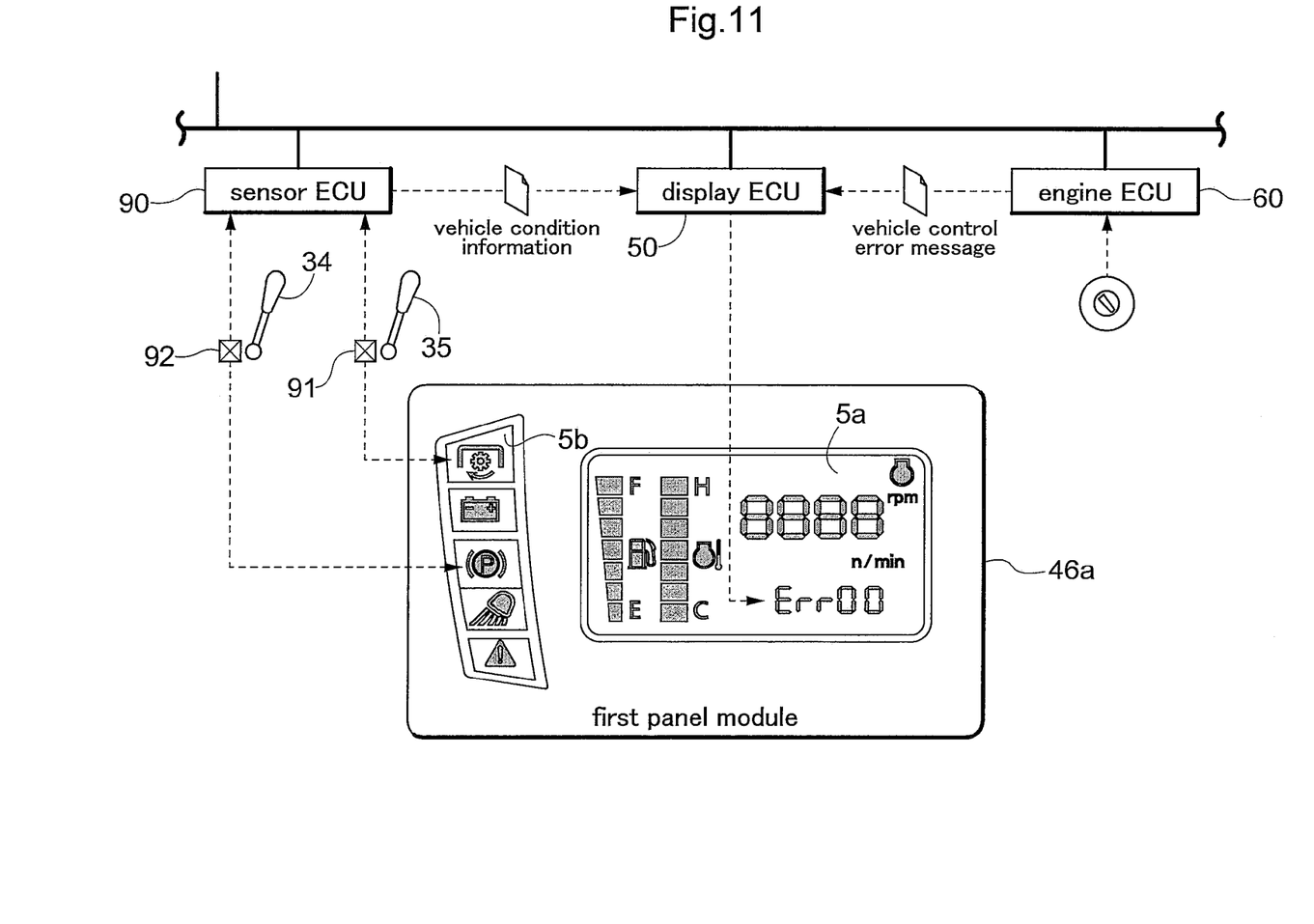
FIG. 11 is block diagram showing relationship between the display control system and a man-machine interface panel.

As may be apparent from FIG. 11, to the display ECU 50, the first panel module 46a is connected. This first panel module 46a includes the flat panel display 5a as the first display section and the LED display units 5b as the second display section. The flat panel display 5a, as the first display section, displays various vehicle condition information based on various vehicle condition signals received from the sensor ECU (one of the control units) 90 via the display ECU 50. The LED panels 5b, as the second display section, display vehicle conditions based on the detection signals received via the sensor ECU 90 or directly from the detection device.

The display ECU 50 inputs information relating mainly the engine as vehicle control error message from the engine ECU 60, e.g. a signal indicating failure of engine start, a signal indicating an engine rotational speed, a signal indicating data of an hour meter cumulative engine operation time, a signal indicating cooling water temperature, a signal indicating an engine error message, etc. The display ECU 50 also inputs vehicle condition signals indicative of operational conditions of the operation input devices 30 such as the operational levers or switches/buttons from the sensor ECU.

In this embodiment, as shown in FIG. 6, at the center portion of the first panel module 46a, the flat panel display 5a is disposed and on the left and right and lower sides thereof, the LED panels 5b are disposed. The screen of the flat panel display 5a is divided into a fuel meter area, a water temperature meter area, an engine rotational speed displaying area, an hour meter displaying area and an engine mode displaying area. The engine mode displaying area is provided on the right-upper side of the engine rotational speed display area in the case of the example illustrated in FIG. 6 and there is formed a bottle-like engine mode icon EM. Lighting of this engine mode icon EM indicates selection of the isochronous control mode. Non-lighting of this engine mode icon EM indicates selection of the droop control mode. The hour meter displaying area is composed of alphabet/numeral displaying segments and is used also as a displaying area for a vehicle control error message and displaying area for a maintenance message urging a vehicle maintenance operation. Therefore, the segments of this hour meter displaying area display not only a numerical value of the hour meter, but also an error code indicative of a vehicle control error message such as "Err00" or a service code indicative of a message urging a maintenance operation such as "Ser1", at predetermined timings. In particular, this service code is displayed at the time of key-ON operation after lapse of a predetermined period, thus avoiding interference with other displays. Further, regarding displaying of the hour meter and the error code, if there occurs a request of displaying an error code, this will be displayed in repetition for a plurality of times at intervals such as 2 seconds interval, with the error code displaying interrupting the hour code displaying (more particularly, a numerical value indicative of an hour meter) effected by the segments.

As may be understood or presumed from the marks or graphical representations of the icons shown in FIG. 6, the display items classified by the marks or icons visually recognized by the LED lighting include e.g. battery charge, parking brake, headlamp, PTO clutch, cooling water temperature, warning of amount of fuel remaining, etc. In the instant embodiment, the vehicle condition signals indicative of engine conditions are first processed by the engine ECU 60 and then sent to the display ECU 50 to be directly sent to the first LED panel 5*b* for LED lighting control. An example of this is a cooling water temperature. The other vehicle condition signals, e.g. a detection signal from the parking sensor 92 for detecting ON/OFF position condition of the parking lever 34 includes two routes of signal transmission line, so that these signals are transmitted not only to the engine ECU 60, but transmitted directly also to the first LED panel 5*b* for its LED lighting control.

The ON/OFF position of the parking brake, that is, the ON/OFF position of the parking lever 34, is a condition for engine start. So, the detection signal from the parking sensor 92 is used for determination of allowing or not allowing engine start by the engine ECU 60. Therefore, with the above-described two routes of signal transmission line arrangement, if the parking brake LED is ON (ON of the parking brake) despite displaying of engine start being not allowed, it may be understood that the other engine start conditions than the parking brake are not satisfied. Conversely, if the parking brake LED is OFF, but the message of engine start not allowed is not displayed, it may be assumed that some trouble has occurred in the signal transmission line of the parking sensor 92.

Incidentally, in the exemplary arrangement shown in FIG. 11, the flat panel display 5*a* is used as the first display section for displaying vehicle condition information based on various vehicle condition signals received from the sensor ECU 90 via the display ECU 50, whereas the LED panels 5*b* are used as the second display section for displaying vehicle conditions detected based on the detection signals via the sensor ECU 90 from the detection devices or directly from the detection devices. Instead of this arrangement, the first display section and the second display section may be provided as separate independent display panels.

What is claimed is:

1. A work vehicle having an engine, wheels driven by power from the engine and a mower unit driven by the power from the engine, the work vehicle comprising:
   a mower driving detecting section for detecting a power transmission condition to the mower unit;
   an isochronous controlling section for controlling the engine in an isochronous control mode for maintaining an engine rotational speed at a predetermined fixed value, independently of an engine load;
   a droop controlling section for controlling the engine in a droop control mode for varying the engine rotational speed in dependence on the engine load; and
   a control mode selecting section for selecting engine control by the isochronous controlling section if power transmission to the mower unit is detected by the mower driving detecting section.

2. A work vehicle according to claim 1, wherein the driving detecting section comprises a detection device for detecting engagement/disengagement of a PTO clutch incorporated in a power transmission pathway between the engine and the mower unit.

3. A work vehicle according to claim 1, wherein the mower unit is a rotary blade type including a housing opened on the side of ground surface and a rotary blade rotated about a vertical axis inside the housing.

4. A work vehicle according to claim 3, wherein the rotary blade includes a wind-generating vane so that mowed grass clippings are discharged to the outside of the mower unit by an airflow generated in association with rotation of the blade.

5. A work vehicle according to claim 1, wherein the isochronous controlling section controls the engine with using a map selected from a plurality of isochronous control characteristics maps in accordance with a grass mowing condition.

6. A work vehicle according to claim 1, further comprising an alerting device for alerting execution of the engine control by the isochronous controlling section.

7. A work vehicle according to claim 1, wherein the alerting device comprises a display section provided in a display for displaying the engine rotational speed.

8. A work vehicle having an engine, wheels driven by power from the engine and a mower unit driven by the power from the engine, the work vehicle comprising:
   a PTO clutch capable of blocking power transmission from the engine to the mower unit;
   an isochronous controlling section for controlling the engine in an isochronous control mode for maintaining an engine rotational speed at a predetermined fixed value, independently of an engine load;
   a droop controlling section for controlling the engine in a droop control mode for varying the engine rotational speed in dependence on the engine load; and
   a control mode selecting section for selecting engine control by the isochronous controlling section while the power is transmitted to the mower unit.

9. A work vehicle according to claim 8, wherein the isochronous controlling section controls the engine with using a map selected from a plurality of isochronous control characteristics maps in accordance with a grass mowing condition.

10. A work vehicle having an engine, wheels receiving power from the engine via a speed changer device and a mower unit receiving the power from the engine, the work vehicle comprising:
    a mower driving detecting section for detecting a power transmission condition to the mower unit;
    an isochronous controlling section for controlling the engine in an isochronous control mode for maintaining an engine rotational speed at a predetermined fixed value, independently of an engine load;
    a droop controlling section for controlling the engine in a droop control mode for varying the engine rotational speed in dependence on the engine load; and
    a control mode selecting section for selecting engine control by the isochronous controlling section while the power is transmitted to the mower unit;
    wherein the mower unit is a rotary blade type including a housing opened on the side of ground surface and a rotary blade rotated about a vertical axis inside the housing;
    wherein in the isochronous control mode, the rotary blade is driven to rotate at a constant speed; and
    wherein the speed changer device is capable of changing the speed with selection of either the isochronous control mode or the droop control mode.

\* \* \* \* \*